United States Patent
Pokorný et al.

(10) Patent No.: US 11,642,607 B2
(45) Date of Patent: *May 9, 2023

(54) COMPACT APPARATUS FOR EXTRACTING WATER FROM AIR

(71) Applicant: Czech Technical University in Prague, Prague-Dejvice (CZ)

(72) Inventors: Nikola Pokorný, VysokýÚjezd (CZ); Viacheslav Shemelin, Hloubětín (CZ); Tomás Matuska, Michle (CZ)

(73) Assignee: Czech Technical University in Prague, Prague (CZ)

( * ) Notice: Subject to any disclaimer, the term of this patent is extended or adjusted under 35 U.S.C. 154(b) by 77 days.

This patent is subject to a terminal disclaimer.

(21) Appl. No.: 17/196,276

(22) Filed: Mar. 9, 2021

(65) Prior Publication Data
US 2021/0283528 A1    Sep. 16, 2021

(30) Foreign Application Priority Data
Mar. 10, 2020   (CZ) ................................ CZ2020-126

(51) Int. Cl.
*B01D 5/00* (2006.01)
*E03B 3/28* (2006.01)

(52) U.S. Cl.
CPC .......... *B01D 5/0003* (2013.01); *B01D 5/009* (2013.01); *B01D 5/0075* (2013.01); *E03B 3/28* (2013.01); *B01D 2257/80* (2013.01)

(58) Field of Classification Search
USPC ..................... 96/266, 149; 95/121; 62/291
See application file for complete search history.

(56) References Cited

U.S. PATENT DOCUMENTS

| 7,251,945 B2 * | 8/2007 | Tongue | B01D 5/0027 62/93 |
| 7,306,654 B2 * | 12/2007 | King | B01D 53/263 95/224 |

(Continued)

FOREIGN PATENT DOCUMENTS

| CZ | 307873 | 7/2019 |
| WO | 2016081863 | 5/2016 |

OTHER PUBLICATIONS

Kim H, Yang S, Rao SR, Narayanan S, Kapustin EA, Furukawa H, et al. Water harvesting from air with metal-organic frameworks powered by natural sunlight. Science (80-) 2017;356:430-4.

(Continued)

*Primary Examiner* — Randy Boyer
*Assistant Examiner* — Juan C Valencia
(74) *Attorney, Agent, or Firm* — Riverside Law LLP

(57) ABSTRACT

The apparatus comprises a first air duct with a first opening and a second opening, in the first air duct are: a cooler, a first suction device and at least part of a sorption heat exchanger having an integrated heating and/or an upstream device for preheating the incoming air. An element for collecting condensed water is also included. The apparatus also comprises a recuperative heat exchanger, which is positioned in the first air duct between the cooler and the sorption exchanger and simultaneously also between the cooler and the second opening. The recuperative heat exchanger has at least two internal conduits connected in such manner, that the first of these internal conduits air-interconnects the sorption exchanger and the cooler and that the second of these internal conduits air-interconnects the cooler and the second opening. The first and second internal conduits of the recuperative heat exchanger are in mutual thermal contact.

(Continued)

The sorption exchanger is also air-interconnected to the first opening.

7 Claims, 2 Drawing Sheets

(56) References Cited

U.S. PATENT DOCUMENTS

| | | | |
|---|---|---|---|
| 7,384,454 B2* | 6/2008 | Tongue | B01D 53/261 95/114 |
| 7,905,097 B1* | 3/2011 | Fort | B01D 53/261 62/271 |
| 7,976,621 B2* | 7/2011 | Shoemaker | B01D 53/263 95/227 |
| 8,043,414 B2* | 10/2011 | Jeng | B01D 53/06 422/186.04 |
| 8,187,368 B2* | 5/2012 | Shih | B01D 53/0438 422/186.04 |
| 8,747,530 B2* | 6/2014 | Goelet | B01D 5/00 95/117 |
| 10,632,416 B2* | 4/2020 | Friesen | B01D 53/14 |
| 10,683,644 B2 | 6/2020 | Kim | |
| 10,835,861 B2* | 11/2020 | Friesen | B01D 53/0454 |
| 11,065,573 B2* | 7/2021 | Matuška et al. | B01D 53/06 |
| 11,266,944 B2 | 3/2022 | Friesen | |
| 11,359,356 B2* | 6/2022 | Friesen | B01D 53/1412 |
| 11,384,517 B2* | 7/2022 | Salloum | E03B 3/28 |
| 11,414,843 B2* | 8/2022 | Friesen | B01D 53/0454 |
| 2007/0028769 A1 | 2/2007 | Eplee | |
| 2007/0175333 A1* | 8/2007 | Shoemaker | B01D 53/263 96/243 |
| 2016/0198991 A1 | 7/2016 | Whelan | |
| 2019/0242097 A1 | 8/2019 | Rockenfeller | |
| 2021/0106946 A1 | 4/2021 | Friesen | |
| 2021/0121821 A1* | 4/2021 | Ball | B01D 53/18 |
| 2021/0283528 A1* | 9/2021 | Pokorný | B01D 5/0003 |
| 2022/0170247 A1* | 6/2022 | Yaghi | B01D 53/0415 |
| 2022/0195706 A1* | 6/2022 | Stuckenberg | C02F 1/041 |

OTHER PUBLICATIONS

Tu R, Hwang Y. Performance analyses of a new system for water harvesting from moist air that combines multi-stage desiccant wheels and vapor compression cycles. Energy Convers Manag 2019:198:111811.

Wang JY, Wang RZ, Tu YD, Wang LW. Universal scalable sorption-based atmosphere water harvesting. Energy 2018;165:387-95.

Wang JY, Wang RZ, Wang LW, Liu JY. A high efficient semi-open system for fresh water production from atmosphere. Energy 2017;138:542-51.

Hamed, et al.. Application of Solar Energy for Recovery of Water from Atmospheric Air in Climatic Zones of Saudi Arabia, Natural Resources, 2011, 2, 8-17.

Kadhim, et al., Experimental study of atmospheric water collection powered by solar energy using the Peltier effect, IOP Conf. Series: Materials Science and Engineering 671 (2020) 11 pages.

Sultan, A., Absorption/Regeneration Non-Conventional System for Water Extraction from Atomspheric Air, Mansoura Engineering Journal (MEJ) 27, 2 p. 60 (2002).

* cited by examiner

COMPACT APPARATUS FOR EXTRACTING WATER FROM AIR

CROSS-REFERENCE TO RELATED APPLICATIONS

This application claims priority to Czech Patent Application No. 2020-126, filed on Mar. 10, 2020, issued as Czech Patent No. 308655 on Dec. 17, 2020, incorporated herein by reference in its entirety.

FIELD OF THE INVENTION

The present invention relates to a mobile and in some possible embodiments also autonomous apparatus allowing the production of water from air even in desert climates, in a very small and compact design.

BACKGROUND

Several apparatuses are currently available on the market operating on the principle of cooling the ambient air by an exchanger with a temperature lower than the dew point temperature, wherein water vapor from the air condensates on its surface in the form of water droplets. The disadvantage of such a solution is that in the case of low specific humidity of the ambient air below 5 g/kg of dry air, the water production is very low and at the same time energy-intensive. Therefore, for example, in desert conditions, conventional units for producing water from atmospheric moisture simply by cooling below the dew point do not produce any water.

Therefore, the effort is to develop an apparatus that would be sufficiently effective even in drier conditions. To a small extent, apparatuses are beginning to appear using an adsorbent material to humidify the air prior to cooling below the dew point temperature. The disadvantage of the previously known apparatuses of this type is still the relatively high energy consumption.

The apparatus according to the application WO 2016/187709 for obtaining water from the air uses a sorption system for dehumidification and humidification of the exterior air. To regenerate the sorption exchanger, it mentions various heat sources from waste heat from the exhaust gases to heat from solar collectors. However, these are external sources, the heat exchanger must be supplied with heat from devices outside the system. The heat from the cooling remains unused, and no cold recovery is described, this results in high energy consumption. The disadvantage is also that the source of electricity for the operation of the unit is electricity supplied from the network. Therefore, it cannot be an autonomous apparatus.

The apparatus according to application WO 2006029249 for obtaining water from air does not utilize a sorption system for removing moisture from the air. The patent describes several principles how to cool the air below the dew point temperature, such as compressor or absorption cooling. The main disadvantage is the very small production of water in desert climatic conditions, compared to the proposed apparatus.

The apparatus according to the patent application US 2006/0272344 uses a sorption system based on a sorption wheel with a solid desiccant with a closed regeneration circuit. Waste heat from the combustion engine of a mobile device is used to regenerate the desiccant, so again this does not represent the use of heat generated directly by the system operation. Similarly to the above, there is a sorption wheel that consumes extra electricity because it has to rotate between two positions. The dehumidified process air leaving the sorption wheel serves as a source of cold for the condensing exchanger, wherein water vapor is precipitated from the humidified air. The disadvantage of such a apparatus is that it can only operate in cold or humid areas where the temperature of the dehumidified process air is sufficiently below the dew point temperature of the humidified air.

The apparatus according to the U.S. Pat. No. 7,601,208 uses for removing moisture from the air a liquid desiccant. First, the liquid desiccant removes moisture from the air stream by spraying. Next, water separates from the desiccant solution by evaporation. The heat source for the evaporation is the waste heat from an internal combustion engine of a mobile device. Subsequently, water vapor condenses in the condenser, where the source of cold is the air drawn from the exterior. A clear disadvantage of such an apparatus is that for the water vapor to condense, the ambient air temperature needs to be sufficiently below the dew point temperature so that water condenses in the cooler.

The apparatus according to the patent application US 2011/0296858 uses a desiccation system with a sorption wheel with a solid desiccant. The ambient air being drawn in passes through the sorption wheel and water vapor is absorbed on the desiccation surface. Subsequently, the already dehumidified air is heated in a microwave chamber to a high temperature and conducted back to the desiccator wheel for its regeneration. Next, the humidified air comes to the cooler, where water vapor condenses. However, it is not clear from the patent what advantage this apparatus with a desiccant wheel has over a conventional condensing apparatus, since the apparatus works with the same flow of process and regenerating air and there is no increase in the moisture content in the air before condensation.

The apparatus according to patent CZ307873 uses a desiccation system with a sorption wheel with a solid desiccant. The apparatus is designed as autonomous. The exterior air drawn in passes through a sorption wheel and water vapor is adsorbed on the desiccation surface. The apparatus uses a refrigerant circuit to heat the regenerating air and to finally cool the air below the dew point, which is advantageous for the overall energy balance. The humidified air is routed to a cooler, where the water vapor condenses. The cold from the cooler is used in one of the proposed embodiments, but this is via two liquid exchangers, which is less efficient than using one air recuperative exchanger. The disadvantage of such an apparatus is also the concept of two air streams, i.e. the operation of two suction devices compared to a single-stream design.

The disadvantage of the solutions known from prior art is therefore the limited scope of use, either in areas with high humidity or with low ambient air temperature. In the case of dry warm areas such as deserts, some apparatuses exhibit low water production or high demands for the supply of external (non-renewable) energy. None of these apparatuses are capable to simultaneously meet the requirement for small dimensions of the apparatus allowing mobility and simultaneously the requirement for an autonomous operation not utilizing the supply of external (non-renewable) energy.

SUMMARY OF THE INVENTION

The above-mentioned disadvantages are eliminated by the compact apparatus for extracting water from air according to the present invention, which uses cold recovery by a countercurrent air exchanger for greater energy efficiency. Such an apparatus can function very efficiently even in desert conditions. In some embodiments, the cold recovery in the countercurrent air exchanger can be advantageously supplemented by some principles known from CZ307873. In addition, the apparatus according to the present invention is compact, small, easily mobile and, owing to its low energy consumption and simultaneously high water production, it is also easy to use in autonomous operation, e.g. only with renewable energy sources.

This compact apparatus for extracting water from the air comprises a first air duct having a first opening of the first air duct for air intake and/or exhaust and also a second opening of the first air duct for air intake and/or exhaust, whereas in the first air duct are located: a cooler, a first suction device for drawing air into the first air duct, and at least a part of a sorption exchanger with integrated heating and/or an upstream device for preheating the incoming air. The principle of this apparatus is that it also comprises a recuperative heat exchanger located in the first air duct between the cooler and the sorption exchanger and simultaneously also between the cooler and the second opening of the first air duct. This recuperative heat exchanger has at least two internal conduits connected in such manner, that the first of these internal conduits air-interconnects the sorption exchanger and the cooler directly or via other elements and that the second of these internal conduits air-interconnects the cooler and the second air duct opening directly or via other elements. The first and second internal conduits of the recuperative heat exchanger are in mutual thermal contact with each other. In addition, the sorption exchanger is also air-interconnected to the first opening of the first air duct directly or via other elements.

It is advantageous if the first air duct between the sorption exchanger and the recuperative heat exchanger is provided with a flap for air interconnection to the exterior.

In some possible embodiments, the apparatus also comprises a refrigerant circuit with refrigerant piping, refrigerant, expansion valve and compressor, to which a cooler is connected as a refrigerant evaporator.

With an advantage, the apparatus also comprises a first heat exchanger, which is positioned between the sorption exchanger and the first opening of the first air duct, this first heat exchanger being connected as a refrigerant vapor condenser and simultaneously as an air heater and is interconnected to the cooler via the refrigerant piping and compressor. The apparatus also comprises a second heat exchanger, which is connected as a refrigerant aftercooling exchanger and is interconnected to the cooler via the refrigerant piping and an expansion valve. In addition, the first heat exchanger and the second heat exchanger are also mutually interconnected by the refrigerant piping.

It is advantageous if the sorption exchanger is lamellar and with integrated heating.

In another advantageous embodiment, the apparatus also comprises a second air duct with an intake opening of the second air duct and an exhaust opening of the second air duct and a second suction device for drawing air into the second air duct. The apparatus is also equipped with a flap for connecting the air ducts, through which the second air duct can be connected to the first air duct. The sorption exchanger is designed here as a rotary desiccant exchanger and part of its volume extends also into the second air duct.

In the embodiment just mentioned, it is advantageous to position a flap for connecting the air ducts in the first air duct in the space between the cooler and the recuperative heat exchanger.

BRIEF DESCRIPTION OF THE DRAWINGS

The invention is described in detail in the specific embodiments using the attached drawings.

FIG. 1 and FIG. 2 depict an exemplary embodiment with one sorption, typically lamellar heat exchanger with an internal energy source, and with one first air duct 1a.

FIG. 1 depicts the air flow in the charging phase of the sorption exchanger 2.

FIG. 2 depicts the air flow in the discharge phase of the sorption exchanger 2, i.e. during the production of water.

FIGS. 1, 2, 3 and 4 depict longitudinal sections of the apparatus.

DETAILED DESCRIPTION

The advantageous embodiments described below illustrate only some of the many possible solutions falling within the protection scope of the invention and illustrate the idea of the invention. These are only selected advantageous embodiments, which in no way limit the scope of protection of the invention.

Figure 1:
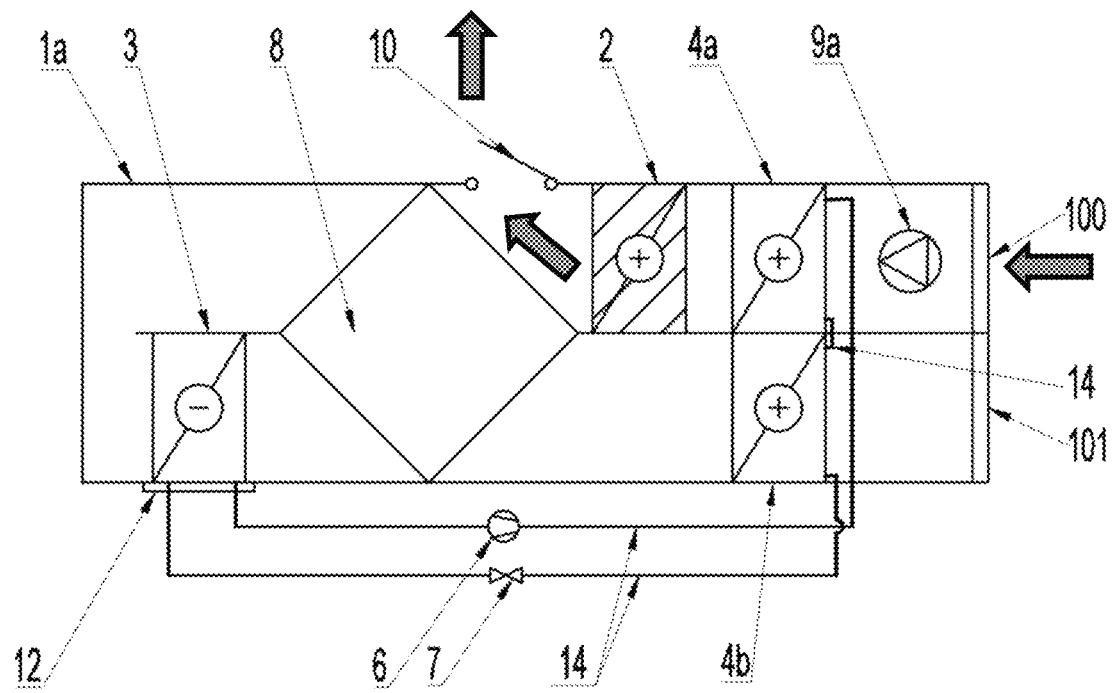
Figure 2:
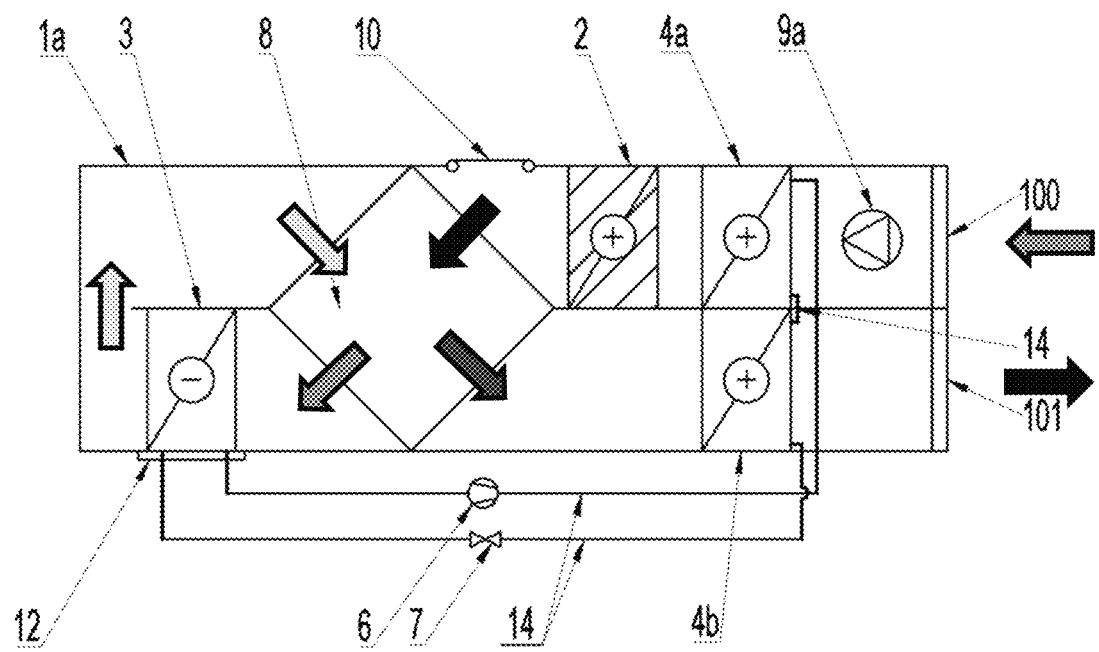

FIGS. 1 and 2 depict an exemplary embodiment of a compact air water extraction apparatus according to the present invention with one sorption, typically lamellar heat exchanger with an internal source of energy.

We will first describe the design of the apparatus and then its function in more detail.

It can be seen that the apparatus comprises a first air duct 1a having a first opening 100 of the first air duct for air intake and/or exhaust and also a second opening 101 of the first air duct for air intake and/or exhaust, whereas in this first air duct 1a are positioned: a cooler 3 and a first suction device 9a for drawing air into the first air duct 1a, and at least a part of a sorption exchanger 2, which has an integrated heating and/or is preceded upstream by a device for preheating the incoming air. The first suction device 9a can be located anywhere in the first air duct 1a, not only in the position depicted in the Figures. It is essential that the apparatus also comprises a recuperative heat exchanger 8 located in the first air duct 1a between the cooler 3 and the sorption exchanger 2 and simultaneously also between the cooler 3 and a second opening 101 of the first air duct 1a. This recuperative heat exchanger 8 has at least two internal conduits connected so that the first of these internal conduits air-interconnects directly or via other elements the sorption heat exchanger 2 and the cooler 3 and the second of these internal conduits air-interconnects directly or via other elements the cooler 3 and the second opening 101 of the first air duct 1a, the first and second internal conduits of the recuperative heat exchanger 8 being in thermal contact with each other. It is therefore an air heat exchanger. The first and second internal conduits of the recuperative heat exchanger 8 may be multiple, in which case they are in the form of small-diameter channels and are arranged in such manner that one first conduit is always in thermal contact with one of the second conduits. Then in this case, also each of the first internal conduits air-connects directly or via other elements the sorption heat exchanger 2 and the cooler 3, and each of the internal conduits air-connects directly or via other elements the cooler 3 and the second opening 101 of the first duct 1a. The sorption exchanger 2 is also directly air-interconnected to the first opening 100 of the first air duct 1a directly or via other elements.

It can also be seen from FIGS. 1 and 2 that the air continuously flows through one air duct 1a, which is cranked or bent in the location of the cooler. The first air duct 1a in FIGS. 1 and 2 starts at the first opening 100 where the air enters and continues through the first suction device 9a, potential other elements and the sorption exchanger 2 further through the recuperative heat exchanger 8, which is inserted into the first air duct 1a, to the main cooler 3. From there, in the discharge mode of the sorption exchanger 2, the air rises through the said cranked part of the first air duct 1a (arrow vertically upwards in FIG. 2) again to the recuperative exchanger 8, through which and other potential elements it continues to the second opening 101 out of the first air duct 1a. In the space delineated by the first and second openings 100, 101 on the one hand and the recuperative heat exchanger 8 on the other hand, the air duct is divided by a partition into two parts to separate the air flow incoming from the first opening 100 and exiting into the second opening 101.

The recuperative heat exchanger 8 is typically countercurrent or cross-flow. With an advantage, it is preferably of a plate design.

Due to the presence of the recuperative heat exchanger 8 connected in this way, cold is recovered, which is used to pre-cool the heated regenerating air entering the cooler which then condenses more easily and because of this it is possible to significantly reduce the required cooling power. The heated and humidified regenerating air downstream of the sorption exchanger 2 is first cooled in the recuperative exchanger 8 and consecutively cooled down on cooler 3, near which an element 12 for collecting the condensed water, which is the main product of the apparatus, is located.

It is advantageous if the first air duct 1a between the sorption exchanger 2 and the recuperative heat exchanger 8 is provided with a flap 10 for air-interconnection to the exterior, also shown in FIGS. 1 and 2.

For heat recovery from cooling on cooler 3 and the associated additional energy savings it is advantageous, if the apparatus also comprises a refrigerant circuit with a refrigerant piping 14, a refrigerant, an expansion valve 7 and a compressor 6, to which the cooler 3 is connected, serving to cool the regenerating air and which is connected as a refrigerant evaporator. Due to this arrangement, the heat from the cooling of the regenerating air by the cooler 3 can be advantageously recovered into the air entering the first air duct 1a through the first opening 100 of the first air duct. With an advantage, the R410A refrigerant is used, which makes it possible to achieve small dimensions of the entire refrigerant circuit.

It is also advantageous if the apparatus comprises a first heat exchanger 4a, which is positioned between the sorption exchanger 2 and the first opening 100 of the first air duct 1a, this first heat exchanger 4a also being connected to the refrigerant circuit and installed as a refrigerant vapor condenser and concurrently as an air heater. This first heat exchanger 4a is via the refrigerant piping 14 and the compressor 6 connected to the cooler 3. The apparatus in this preferred embodiment also comprises a second heat exchanger 4b, which is installed as an aftercooling refrigerant exchanger and is via the refrigerant piping and the expansion valve 7 connected to the cooler 3. The first heat exchanger 4a and the second heat exchanger 4b are also mutually interconnected by the refrigerant piping 14.

The sorption exchanger 2 shown in FIGS. 1 and 2 is lamellar and with integrated heating. However, the integrated heating can be replaced by, for example, preheating, which means that in the case of an embodiment with the first heat exchanger 4a functioning as a heater, the integrated heating in the sorption exchanger 2 is not necessary, but is also advantageous in this embodiment.

A more detailed description of the function of the apparatus according to FIGS. 1 and 2 follows:

FIG. 1 depicts the flow direction during charging of the sorption exchanger 2. Throughout this description, the term charging of the sorption exchanger means water adsorption on the surfaces of the exchanger, the term discharging of the sorption exchanger means desorption of water from the surfaces of the sorption exchanger. When charging the sorption exchanger 2, ambient air enters the apparatus through the first opening 100 for air intake and exhaust of the first air duct, then air humidity is adsorbed on the sorption exchanger 2 and subsequently the dehumidified air exits to the ambient environment by the flap 10 for air-interconnection to the exterior. Before the air exits, in some embodiments it can still pass through the first heat exchanger 4a, which, however, is not in operation in the charging mode (it acts as a heater in the discharging mode). However, the flap 10 for air-interconnection to the interior is not necessary, if not installed in the apparatus, when charging the sorption exchanger, the air will flow through the entire apparatus with the heating switched off, i.e. from the first opening 100, of the first air duct to the second opening 101 of the first air duct.

FIG. 2 indicates the flow direction during the discharge of the sorption exchanger 2, i.e. during the production of water. The first suction device 9a in this mode ensures the flow of air through the first air duct 1a in the same direction, but the flap 10 for air-interconnection to the exterior is closed. The air enters the apparatus through the first opening 100 of the first air duct, then in an advantageous embodiment it passes through the first heat exchanger 4a where it is heated to the required regeneration temperature and is subsequently, in an optimum case, additionally heated by an internal energy source in the sorption exchanger 2 with an internal energy source. At the same time, the sorption exchanger expels water molecules from its surface and humidifies the air. The humid hot air then enters the first duct or first ducts of the recuperative heat exchanger 8 (arrows from top right to down left in FIG. 2), where it is pre-cooled by air coming from the cooler and passing through the second conduit or second conduits of the heat exchanger 8 (arrows from top left to down right in FIG. 2). Subsequently, the humid air coming from the sorption exchanger 2 through this first conduit or first conduits of the recuperative heat exchanger is aftercooled on the cooler 3 to a temperature lower than the dew point temperature. The condensed water is captured by the water collecting element 12 under the cooler. The dehumidified cold air then enters the second conduit or second conduits of the recuperative heat exchanger 8. The apparatus comprises a refrigerant circuit, due to which heat can be advantageously recovered from cooling on the cooler 3, which is installed as a refrigerant evaporator, into the air entering through the first opening 100 of the first air duct 1a. In an advantageous embodiment, the refrigerant circuit by refrigerant piping 14 connects the cooler 3 for cooling the regenerating air, functioning as a refrigerant evaporator, and the first heat exchanger 4 for heating regenerating air, functioning as a condenser for condensing the refrigerant vapor, in other words, absorbs energy from refrigerant vapor heated in the refrigerant evaporator and thus recovers heat from cooling. The interconnection of the cooler 3 to the first heat exchanger 4a by the refrigerant piping 14 is routed through the compressor 6 for suction and compression of the evaporated refrigerant. Because the heat power pumped by the refrigerant circuit may be greater than the power required to heat the regenerating air on the first heat exchanger 4a, on the refrigerant piping 14, in series downstream of the heater 4a, a second heat exchanger 4b is connected functioning as a subcooler for additional heat removal from the refrigerant. The second heat exchanger is interconnected by the refrigerant piping 14 via the expansion valve 7 to the cooler 3 serving as a refrigerant vapor evaporator. The air leaving the recuperative exchanger 8 is further heated by the second heat exchanger 4b serving as an aftercooling exchanger for the refrigerant.

Figure 3:
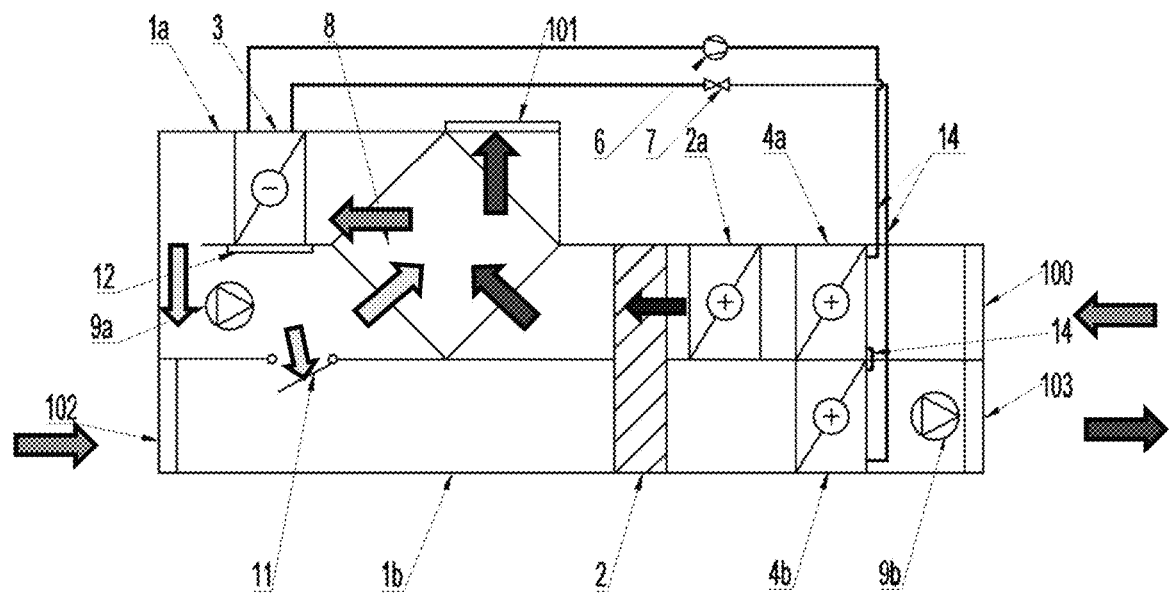
FIG. 3 depicts an embodiment with two air ducts 1a and 1b, in which the sorption exchanger 2 has the form of a desiccation wheel.

FIG. 3 depicts another possible embodiment of the invention. Again, we first describe its construction and then its function.

The apparatus in FIG. 3 also comprises a second air duct 1b with an intake opening 102 of the second air duct and an exhaust opening 103 of the second air duct and a second suction device 9b for drawing air into the second air duct 1b. In this embodiment, it is also fitted with the flap 11 for interconnecting the air ducts, via which the second air duct 1b can be interconnected to the first air duct 1a. The sorption exchanger 2 is designed here as a rotary desiccant exchanger which extends by part of its volume also into the second air duct 1b.

The flap 11 for interconnecting the air ducts is with an advantage positioned in the first air duct 1a in the space between the cooler 3 and the recuperative heat exchanger 8.

FIG. 1 depicts a section of the main part of the apparatus in a preferred embodiment with the sorption exchanger 2, which is rotary desiccant for continuous water production. The arrows in bold indicate the direction of the air flow in the air ducts 1a and 1b. The first opening 100 of the first air duct 1a serves as a regenerating air inlet and the first opening 102 of the second air duct 1b serves as an inlet for the process air. The second opening 101 of the first air duct 1a is a regenerating air outlet, a second opening 103 of the second air duct 1b is a process air outlet. All these openings are connected to the ambient environment. In the air ducts 1a and 1b, the sorption exchanger of a rotary design is arranged so that it extends into each of the air ducts 1a, 1b by at least a part of its volume. In the second air duct 1b, the desiccant in the sorption exchanger 2 adsorbs water vapor from the air, and in the first air duct 1a, water vapor is expelled from the surface of the sorption exchanger 2. In an advantageous embodiment, the volume flow through the sorption exchanger should be approximately three times smaller in the air duct 1a than in the air duct 1b. The suction devices 9a and 9b operate concurrently. In the air duct 1a the entering air, which is first preheated by the heater—the first heat exchanger 4a and subsequently additionally heated to the regeneration temperature by, for example, an electric heater 2a. The air then enters the sorption exchanger 2 of a rotary design, where water vapor is released from the surface of the sorption exchanger 2. The humidified hot air enters the countercurrent recuperative exchanger 8 to pre-cool the air again through the first conduit or first conduits of this recuperative heat exchanger 8 and then the air is aftercooled on the cooler 3, below which a water collecting element is installed 12. The water condenses primarily on the cooler 3, in some cases it may condense on the recuperative heat exchanger 8 from where the water will be routed to the element 12 for collecting condensed water, which may be common or separate from the water collecting element 12 installed below the cooler. If the elements 12 for water collecting are installed in different places of the apparatus, they may or may not be interconnected. The apparatus, again with an advantage, comprises a refrigerant circuit with the refrigerant piping 14, due to which the heat from cooling can be advantageously recovered from the cooler 3 connected as a refrigerant vapor evaporator, to the air entering through the first opening 100 of the first air duct 1a by means of the first heat exchanger 4a for heating regenerating air, which functions as a condenser for condensing refrigerant vapors. The cooler 3 for cooling the regenerating air is interconnected by refrigerant piping 14 via the compressor 6 drawing and compressing the evaporated refrigerant to the first heat exchanger 4a for heating the regenerating air. Because the heat power pumped by the refrigerant circuit may be greater than the power required to heat the regenerating air on the first heat exchanger 4a, in the refrigerant piping 14, in series downstream of the heater 4a, a second heat exchanger 4b is connected functioning as a subcooler for additional heat removal from the refrigerant. The aftercooling exchanger is connected by the refrigerant piping 14 via an expansion valve 7 to the evaporator 3.

Figure 4:
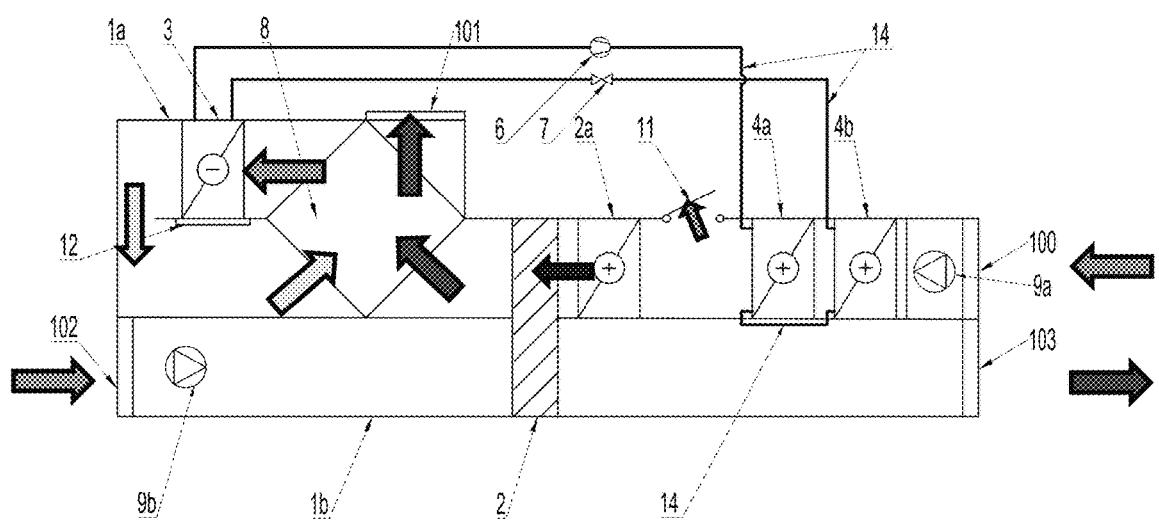
FIG. 4 depicts another preferred embodiment of the invention.

FIG. 4 shows another possible embodiment of the invention. Again, we first describe its design and then its function.

The apparatus in FIG. 4 also comprises a second air duct 1b with an intake opening 102 of the second airduct and an exhaust opening 103 of the second airduct and a second suction device 9b for drawing air into the second airduct 1b. In this embodiment, it is also provided with a flap 11, through which a first air duct 1a can be interconnected to the ambient environment. A sorption exchanger 2 is implemented here as a rotary desiccant exchanger and extends by part of its volume also into the second air duct 1b.

The flap 11 for interconnection to the ambient environment is in the first air duct 1a advantageously positioned in the space between a heat exchanger 4a and an electric heater 2a.

FIG. 4 depicts a section of the main part of the apparatus in an advantageous embodiment with a sorption exchanger 2, which is rotary desiccant for continuous water production. The arrows in bold indicate the direction of air flow in the air ducts 1a and 1b. Because the heat power pumped by the refrigerant circuit may be greater than the power required to heat the regenerating air on the first heat exchanger 4a, in the refrigerant piping 14, in series upstream of the heater 4a, a second heat exchanger 4b is connected functioning as a subcooler for additional heat removal from the refrigerant. The aftercooling exchanger is interconnected by the refrigerant piping 14 via an expansion valve 7 to an evaporator 3. Should it be necessary to remove more heat power than the aftercooler 4b is able to remove, it is possible to take advantage of an increased air flow using the suction device (9a) and to remove the excess heat through the flap 11.

Thus, in all embodiments of the present invention, the recuperative heat exchanger is used to pre-cool the air upstream of the cooler 3. Thus, the required cooling power of the cooler in which the refrigerant vapors evaporate, is significantly reduced 3, and this results in a reduction in the power consumption for the compressor drive 6.

Thus, in the apparatus according to the present invention, energy savings occur mainly due to the recovery of cold from the cooler 3 to pre-cool the regenerating air coming from the sorption exchanger 2 to the cooler 3 via the recuperative exchanger 8. Additional energy savings can be achieved in advantageous embodiments due to the heat recovery from cooling on the cooler 3, this recovery taking place in the form of condensation of refrigerant vapors in the first heat exchanger 4a serving as a regenerating air heater. Owing to this energy undemanding design, it is possible to operate the apparatus with high productivity fully autonomously, using renewable energy sources. As a result, the apparatus according to the present invention achieves a high degree of autonomy compared to sorption devices without a recuperative heat exchanger and produces significantly more water under desert climatic conditions than conventional condensing devices. In addition, the single air duct apparatus shown in FIGS. 1 and 2 is very compact and easy to relocate.

For example, an apparatus with dimensions of 1×1×2 m in one of the possible embodiments and only with energy supplied from renewable sources, can achieve an average daily water production of 10 or more liters per day in desert conditions.

The mobile apparatus equipped with renewable energy sources makes water production possible anywhere in the world, even in arid desert areas. Water is produced autonomously without the need for external energy, the apparatus uses energy sources (electricity, heat, cold) from the ambient environment, solar radiation, and energy recovery from its own processes. The advantage of the developed apparatus in comparison to the existing drinking water production apparatuses is the possibility of use in areas with very low specific humidity, where conventional units for water production from atmospheric humidity by cooling below the dew point only do not work, as well as its compactness and mobility.

INDUSTRIAL APPLICABILITY

The apparatus is advantageous to use especially in desert areas where the specific humidity is low. The apparatus according to the present invention is small in size, i.e. easy to transport. This is one of the reasons why its use in humanitarian crises or armed conflicts is also suggested. The apparatus can be operated autonomously without the use of non-renewable energy sources, or with a local energy source without a connection to the distribution network.

The invention claimed is:

1. A compact apparatus for extracting water from air, comprising:
   a first air duct, comprising:
      a first opening configured as at least one of an inlet or outlet; and
      a second opening configured as at least one of an inlet or outlet;
   a cooler positioned in the first air duct;
   a first suction device positioned in the first air duct, configured to draw air into the first air duct;
   a sorption exchanger positioned at least partially in the first air duct;
   a heating element selected from a heater integrated into the sorption exchanger or an upstream device configured to preheat incoming air;
   an element for collecting condensed water; and
   a recuperative heat exchanger positioned in the first air duct between the cooler and the sorption exchanger, the cooler positioned on the opposite side of the recuperative heat exchanger from the second opening of the first air duct;
   wherein the recuperative heat exchanger comprises at least first and second internal conduits, the first internal conduit fluidly connected to the sorption exchanger and the cooler and the second internal conduit fluidly connected to the cooler and the second opening of the first air duct;
   wherein the first and second internal conduits of the recuperative heat exchanger are in thermal contact with each other; and
   wherein the sorption exchanger is fluidly connected to the first opening of the first air duct.

2. The apparatus according to claim 1, wherein the first air duct further comprises a flap positioned between the sorption exchanger and the recuperative exchanger configured to fluidly connect or disconnect the first air duct with an exterior of the apparatus.

3. The apparatus according to claim 1, further comprising a refrigerant circuit comprising refrigerant piping, refrigerant, an expansion valve, a compressor, and the cooler, with the cooler configured as a refrigerant evaporator.

4. The apparatus according to claim 3, the refrigerant circuit further comprising:
   a first heat exchanger positioned between the sorption exchanger and the first opening of the first air duct, the first heat exchanger configured as a refrigerant vapor condenser, and also connected via the refrigerant piping and the compressor to the cooler; and
   a second heat exchanger fluidly connected to the first heat exchanger via the refrigerant piping, the second heat exchanger configured as a refrigerant subcooler and connected to the cooler via the refrigerant piping and an expansion valve.

5. The apparatus according to claim 1, wherein the sorption exchanger is lamellar and comprises integrated heating.

6. The apparatus according to claim 1, further comprising:
   a second air duct having an inlet, an outlet, and a second suction device configured to draw air into the second air duct; and
   a flap configured to fluidly connect or disconnect the first and second air ducts,
   wherein the sorption exchanger is a rotary desiccant exchanger and is positioned at least partially in the second air duct.

7. The apparatus according to claim 6, wherein the flap is positioned in the first air duct between the cooler and the recuperative heat exchanger.

* * * * *